Feb. 11, 1936.  R. B. ARMSTRONG  2,030,778
CAMERA
Filed Jan. 10, 1935

Inventor
Robert B. Armstrong
By Clarence A. O'Brien
Attorney

Patented Feb. 11, 1936

2,030,778

UNITED STATES PATENT OFFICE 2,030,778

CAMERA

Robert B. Armstrong, Roachdale, Ind.

Application January 10, 1935, Serial No. 1,251

2 Claims. (Cl. 95—31)

The present invention relates to new and useful improvements in cameras and has for its primary object to provide, in a manner as hereinafter set forth, a camera including novel means through the medium of which full or one-half size exposures and various numbers of exposures, for example, from eight to sixteen may be made on a film of given length.

Another important object of the invention is to provide a camera including a pair of swinging shutters for controlling the area of the film to be exposed, together with novel means for actuating said shutters.

Still another important object of the invention is to provide means for taking different sizes of pictures which may be incorporated in various types of cameras, such as the well known box and folding or collapsible types.

Other objects of the invention are to provide a camera of the aforementioned character which will be comparatively simple in construction, strong, durable, highly efficient and reliable in use, compact, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1:
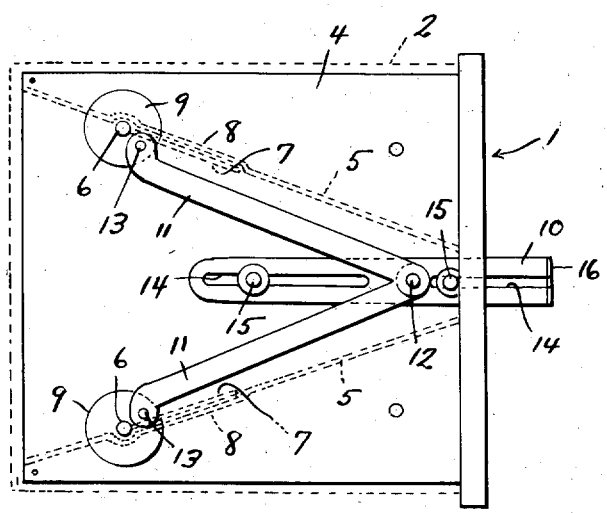
Figure 1 is a view in side elevation of the film box of a box type camera, showing an embodiment of the present invention installed thereon.

Referring now to the drawing in detail, it will be seen that the reference numeral 1 designates the film box of a camera which, as usual, is mounted in a case 2. Rollers 3, over which the film (not shown) travels in the usual manner, are journaled between the upper and lower rear corner portions of the side walls 4 of the box 1.

Figure 2:
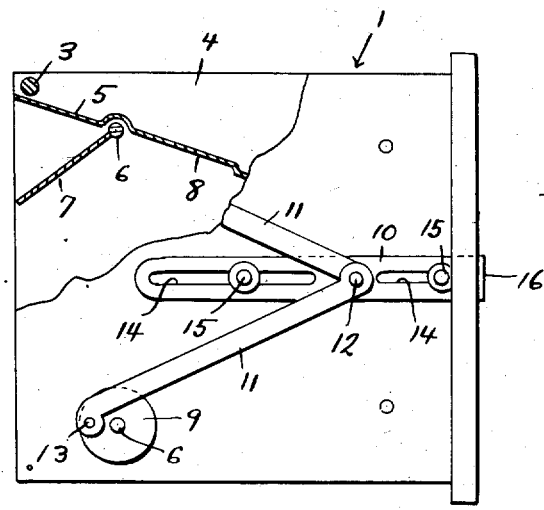
Figure 2 is a view similar to Figure 1, but showing the present invention in operative position, a portion of the box being broken away to expose one of the shutters.

Journaled in the side walls 4 of the box 1, in a rear portion of said box and adjacent the forwardly converging plates 5, is a pair of shafts 6 on which shutters 7 are fixed. The plates 5 of the box 1 are pressed outwardly to form depressions 8 (see Figure 2) for the reception of the shutters 7 when said shutters are in inoperative position, as shown in dotted lines in Figure 1 of the drawing.

The shafts 6 extend through the side walls 4 of the box 1 and fixed on one end of said shafts are disks 9. Slidably mounted on one of the side walls 4 of the box 1 is a bar 10 to an intermediate portion of which links 11 are pivotally connected, at one end, as at 12. The other ends of the links 11 are pivotally connected off center to the disks 9, as at 13. The slide bar 10 has formed therein longitudinal slots 14 in which pins 15 are slidably engaged for mounting said slide bar in position on the box 1. At its outer or forward end, the slide bar 10 terminates in an angularly extending operating handle 16.

The camera is preferably provided with an upper opening, an intermediate opening, and a lower opening or window.

In use, when it is desired to make the first picture on the film full size, said film is actuated or drawn around the rear of the box 1 in a conventional manner until the numeral thereon appears in the upper window. The slide bar 10 is then pulled outwardly, as in Figure 1, to swing the shutters 7 to inoperative position in the recesses 8. It will thus be seen that substantially the entire area of the film at the back of the box 1 will be exposed when the picture is taken. Now, should it be desired to take a one-half size picture, the film is actuated to bring the next numeral into view in the intermediate window. The slide bar 10 is then pushed inwardly, as in Figure 2, thus swinging the shutters 7 rearwardly in a manner to screen substantially one-half of the area of the film which would otherwise be exposed. Then, to take another one-half size picture, the film is again actuated to bring the same numeral thereon into view in the lower window, the shutters 7, of course, being left in operative position.

It is believed that the many advantages of a camera constructed in accordance with the present invention will be readily understood, and although preferred embodiments of the invention are as illustrated and described, it is to be understood that changes in the details of construction and in the combination and arrangement of parts may be resorted to which will fall within the scope of the invention as claimed.

What is claimed is:—

1. A camera of the class described comprising a case, an exposure box mounted in said case, a pair of shafts journaled in the exposure box adjacent the exposure area, shutters fixed on the shafts for varying the size of the exposure area, disks fixed on the shafts, a bar slidably mounted on the exposure box, and links pivotally connected, at one end, to an intermediate portion of the bar and pivotally connected at their other ends off center to the disks for actuating the shutters to operative and inoperative position.

2. A camera of the class described, comprising a case having rearwardly diverging walls therein, said walls having their rear portions outwardly offset and each wall having a transversely extending recess in the intermediate part of its offset portion, the recess opening out from the inner face of the wall, a shaft and passing through each recess, a shutter carried by each shaft when in inoperative position bearing against that part of the offset portion of the wall which is located in front of the recess, said shutters when in operative position converging rearwardly with the free edges contacting portions of the film, and means for operating the shafts in unison from the exterior of the camera to move the shutters to operative and inoperative positions.

ROBERT B. ARMSTRONG.